(12) United States Patent
Ku et al.

(10) Patent No.: US 9,420,339 B2
(45) Date of Patent: *Aug. 16, 2016

(54) METHOD AND SYSTEM FOR DETERMINING SUBSCRIBER DEMAND FOR MULTIMEDIA CONTENT

(71) Applicant: AT&T Intellectual Property I, L.P., Atlanta, GA (US)

(72) Inventors: Bernard Ku, Austin, TX (US); Arshad Khan, Austin, TX (US); Niral Sheth, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,969

(22) Filed: Feb. 2, 2015

(65) Prior Publication Data

US 2015/0150030 A1  May 28, 2015

Related U.S. Application Data

(63) Continuation of application No. 11/849,193, filed on Aug. 31, 2007, now Pat. No. 8,949,877.

(51) Int. Cl.

| | |
|---|---|
| H04N 7/16 | (2011.01) |
| H04N 21/45 | (2011.01) |
| H04N 7/173 | (2011.01) |
| H04N 21/466 | (2011.01) |
| H04N 21/4786 | (2011.01) |
| H04N 21/482 | (2011.01) |
| H04N 21/643 | (2011.01) |

(Continued)

(52) U.S. Cl.
CPC ....... *H04N 21/4532* (2013.01); *H04N 7/17318* (2013.01); *H04N 21/4661* (2013.01); *H04N 21/4786* (2013.01); *H04N 21/4826* (2013.01); *H04N 21/6437* (2013.01); *H04N 21/64322* (2013.01)

(58) Field of Classification Search
CPC .............. H04N 21/44218; H04N 21/44213; H04N 21/44222; H04N 21/4532; H04N 21/458; H04N 21/4661; H04N 21/4662; H04N 21/4663; H04N 21/4665; H04N 21/4667; H04N 21/4666
USPC ............................................ 725/25, 46
See application file for complete search history.

(56) References Cited

U.S. PATENT DOCUMENTS

| | | |
|---|---|---|
| 5,646,676 A | 7/1997 | Dewkett et al. |
| 5,758,257 A | 5/1998 | Herz et al. |

(Continued)

*Primary Examiner* — Pankaj Kumar
*Assistant Examiner* — Reuben M Brown
(74) *Attorney, Agent, or Firm* — Jackson Walker L.L.P.

(57) ABSTRACT

A method of determining demand for multimedia content in a multimedia provider network includes receiving a content demand statistics (CDS) request from a client application where the request identifies a subscriber set. Responsive to the CDS request, selected CDS data is retrieved from a CDS subsystem. The CDS data is indicative of demand for multimedia content among subscribers in the subscriber set. The retrieved CDS data is delivered to the client application. The selected data may be selected from past data, present data, and future data. The CDS request indicates a set of buddy subscribers and the messaging server retrieves CDS data associated with the buddy subscribers. A security subsystem may be accessed and to determine, prior to retrieving CDS data for a particular buddy subscriber, whether the particular buddy subscriber has authorized the requesting subscriber.

20 Claims, 4 Drawing Sheets

(51) Int. Cl.
*H04N 21/6437* (2011.01)
*H04N 5/445* (2011.01)

(56) References Cited

U.S. PATENT DOCUMENTS

| | | | |
|---|---|---|---|
| 5,887,192 A | 3/1999 | Nishio | |
| 6,049,823 A | 4/2000 | Hwang | |
| 6,341,310 B1 | 1/2002 | Leshem et al. | |
| 6,530,082 B1 | 3/2003 | Del Sesto et al. | |
| 7,117,254 B2 * | 10/2006 | Lunt | G06Q 10/10 705/319 |
| 7,299,290 B2 | 11/2007 | Karpoff | |
| 7,305,357 B2 | 12/2007 | Hamilton | |
| 7,343,375 B1 | 3/2008 | Dulac | |
| 7,415,537 B1 | 8/2008 | Maes | |
| 8,060,624 B1 | 11/2011 | McKinney et al. | |
| 8,381,240 B2 | 2/2013 | Jacoby et al. | |
| 8,595,146 B1 * | 11/2013 | Liew | H04L 65/403 705/319 |
| 8,949,877 B2 * | 2/2015 | Ku | H04N 7/17318 725/25 |
| 2002/0112239 A1 | 8/2002 | Goldman | |
| 2003/0046385 A1 | 3/2003 | Vincent | |
| 2003/0101449 A1 | 5/2003 | Bentolila et al. | |
| 2004/0104945 A1 | 6/2004 | Kearns et al. | |
| 2004/0117816 A1 | 6/2004 | Karaoguz et al. | |
| 2006/0129547 A1 * | 6/2006 | Yamamoto | H04N 21/482 |
| 2007/0033148 A1 | 2/2007 | Cahill | |
| 2007/0061831 A1 | 3/2007 | Savoor et al. | |
| 2007/0136745 A1 | 6/2007 | Garbow et al. | |
| 2007/0143218 A1 | 6/2007 | Vasa | |
| 2007/0157262 A1 | 7/2007 | Ramaswamy et al. | |
| 2007/0169148 A1 | 7/2007 | Oddo et al. | |
| 2007/0233893 A1 | 10/2007 | Karpoff | |
| 2007/0255785 A1 | 11/2007 | Hayashi et al. | |
| 2007/0266401 A1 * | 11/2007 | Hallberg | H04N 7/17318 725/46 |
| 2008/0077964 A1 | 3/2008 | Hamilton | |
| 2008/0250040 A1 | 10/2008 | Cotsakos et al. | |
| 2008/0250328 A1 * | 10/2008 | Konttinen | G06F 17/30035 715/747 |
| 2008/0285543 A1 | 11/2008 | Qiu et al. | |
| 2008/0304495 A1 | 12/2008 | Jackson et al. | |
| 2008/0311888 A1 | 12/2008 | Ku et al. | |
| 2008/0313680 A1 | 12/2008 | Suzanne et al. | |
| 2008/0320510 A1 * | 12/2008 | Wong | H04N 7/17318 725/24 |
| 2009/0044236 A1 | 2/2009 | Bendiabdallah et al. | |
| 2009/0067409 A1 | 3/2009 | Ku et al. | |
| 2009/0154899 A1 | 6/2009 | Barrett et al. | |
| 2010/0064320 A1 * | 3/2010 | Angiolillo | H04N 60/64 725/46 |
| 2010/0088715 A1 | 4/2010 | Sloo | |
| 2010/0217837 A1 | 8/2010 | Ansari et al. | |
| 2011/0145931 A1 * | 6/2011 | Galbreath | G06Q 30/02 726/28 |
| 2011/0239244 A1 * | 9/2011 | Karaoguz | H04N 7/163 725/14 |
| 2013/0282824 A1 | 10/2013 | Galbreath et al. | |
| 2014/0215509 A1 | 7/2014 | Angiolillo et al. | |
| 2015/0150030 A1 * | 5/2015 | Ku | H04N 7/17318 725/9 |

* cited by examiner

METHOD AND SYSTEM FOR DETERMINING SUBSCRIBER DEMAND FOR MULTIMEDIA CONTENT

The present patent application is a continuation of U.S. patent application Ser. No. 11/849,193, filed Aug. 31, 2007, issuing as U.S. Pat. No. 8,949,877 on Feb. 3, 2015, the entirety of which is hereby incorporated by reference.

BACKGROUND

1. Field of the Disclosure

The disclosed subject matter is in the field of information networks and, more specifically, information networks suitable for delivering television services.

2. Description of the Related Art

As an increasingly large volume of multimedia content becomes available through services such as movies on demand, it becomes increasing difficult for customers to locate and access the content that they want. In primary technique for accessing entertainment content in digital cable systems, satellite systems, or devices such as Windows Media Center or personal video recorders, such as TIVO®, includes manipulating an onscreen graphical user interface using a handheld infrared or radio frequency (RF) remote control device.

These remote control interfaces confine the user to a very limited domain for interacting with the system. To find content, a user clicks through hierarchical menus or has to spell out titles or other search terms using an onscreen keyboard or, in some cases, using triple-tap input on the remote control. These interfaces are cumbersome and, as the amount of content increases, the limitations of such interfaces will become still more readily apparent as users will have to scroll through longer and longer lists of options to locate content. Users may never find the desired content even when it is available.

DESCRIPTION OF THE EMBODIMENT(S)

With the advent of television services offering hundreds of channels of programming, the process of identifying suitable content for viewing is recognizable. While electronic programming guides provide display currently available content, they generally do not provide qualitative critical evaluations of the available content. Subscribers might benefit from the ability to determine what content is most popular within a definable and identifiable subset of other subscribers as a proxy for determining suitable and worthwhile content. One might define, for example, family members, friends, colleagues, and so forth as meaningful subscriber subsets. It would be desirable to enable subscribers to define subsets of other subscribers and to determine the demand level for specified content within the defined subset.

In some embodiments of the content demand statistics system and method described herein, infrastructure within an Internet-enabled broadband content access paradigm such as Internet Protocol based TV (IPTV) is leveraged to enable an application in which a subscriber can define subscriber subsets and, with the authorization of the subscribers in the subset, view statistics indicative of demand levels for past, present, and/or future content.

Figure 1:
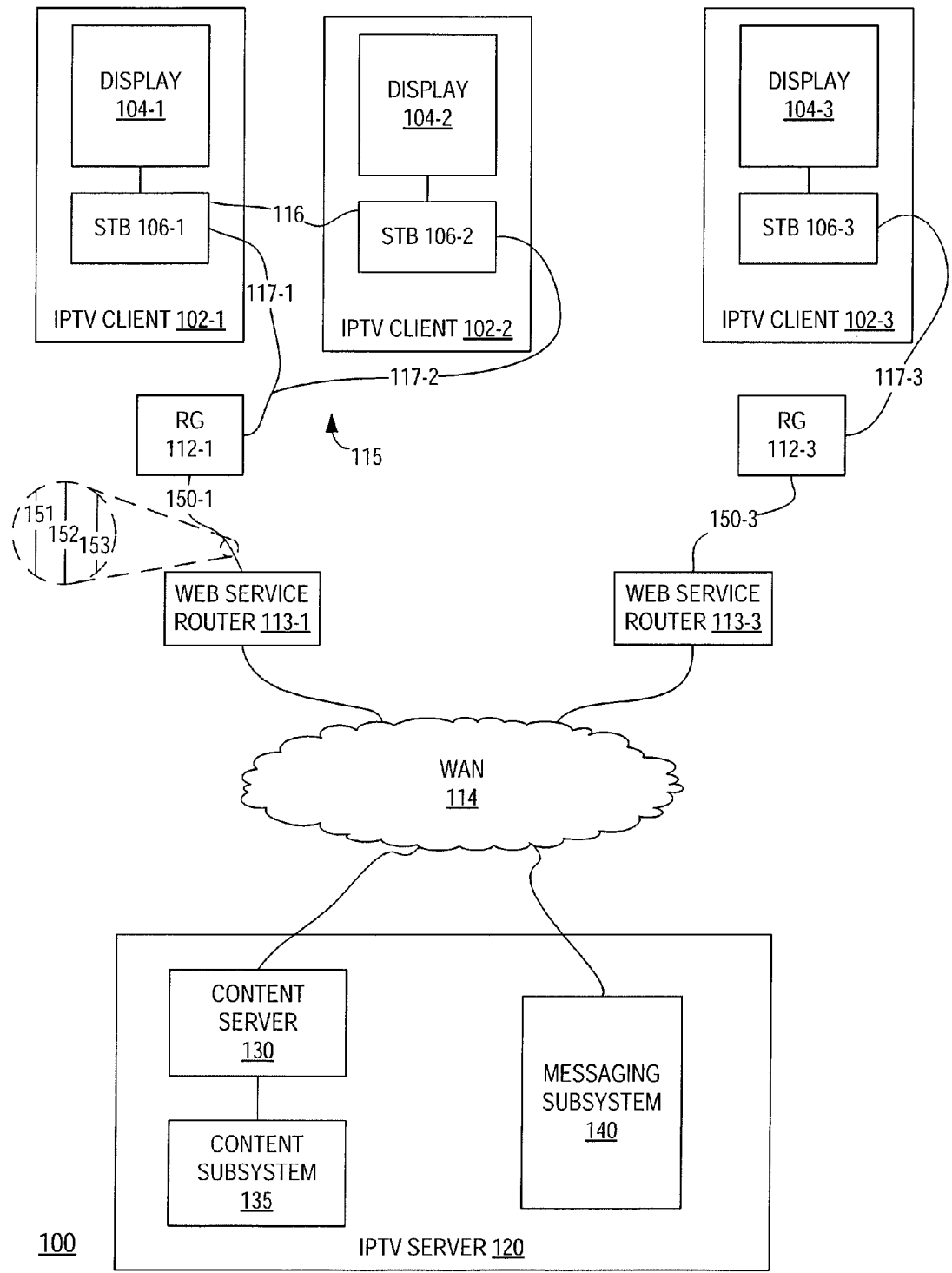
FIG. 1 is a block diagram of selected aspects of an embodiment of an IPTV system.

Referring now to the drawings, FIG. 1 illustrates selected aspects of an embodiment of an IPTV system 100. Throughout this disclosure, a hyphenated form of a reference numeral refers to a specific instance of an element and the corresponding un-hyphenated form of the reference numeral refers to the element generically or collectively. Thus, for example, reference numeral 102-1 refers to an instance of a generic element 102. As shown in FIG. 1, IPTV system 100 includes one or more IPTV clients 102 including IPTV clients 102-1, 102-2, and 102-3, one or more residential gateways 112 including residential gateway (RG) 112-1 and RG 112-3, and an IPTV server 120. In the depicted embodiment, IPTV clients 102 communicate with IPTV server 120 via residential gateways 112 over a wide area network (WAN) 114. WAN 114 represents various well known network devices and media operable to enable networked communication between remotely located devices. WAN 114 may, in some embodiments, encompass the Internet and one or more local area networks (LANs).

Some information transmitted over WAN 114 may comply with one or more connection-based network protocol stacks such as, for example, a protocol stack including the hypertext transfer protocol (HTTP) over the transmission control protocol (TCP) over the internet protocol (HTTP/TCP/IP). Other information transmitted over WAN 114 may comply with one or more connectionless network protocol stacks such as, for example, a streaming video protocol stack including the real-time transfer protocol (RTP) over the User Datagram Protocol (UDP) over IP (RTP/UDP/IP). Although certain information traversing WAN 114 to or from RG 112-1 may be RTP/UDP/IP compliant information while other information may be HTTP/TCP/IP compliant information, both types of information traverse a common physical medium 150-1.

FIG. 1 as shown includes a magnified view of the physical medium 150-1 to illustrate the concept of multiple logical connections and/or messages sharing a common physical medium. Physical medium 150-1 as shown in FIG. 1 includes a TCP/UDP/IP data socket 151 over which IPTV Server 120 may send multimedia content to IPTV client 102, an HTTP/TCP/IP connection 152 over which IPTV client 102 and IPTV server 120 may engage in web communication, and a UDP/IP socket 153 over which messaging subsystem 140 may send responses and notifications to IPTV client 102.

Thus, WAN 114 as shown in FIG. 1 supports streaming multimedia communication, including, for example, RTP/UDP compliant communication represented by streaming multimedia socket 151, as well as HTTP compliant communication represented by connection 152. The physical medium 150 for WAN 114 may include, for example, twisted wire pair, optical fibers, wireless transmission, coaxial cables, and the like.

In the depicted embodiment, the network connection between WAN 114 and RG's 112-1 and 112-3 over physical medium 150 traverses a server identified as web service router 113. In some embodiments, web service router 113 implements a router function between requests from IPTV clients 102 and various server machines that IPTV clients 102 may access. Web service router 113 may also provide or support a firewall based security feature in which web service router 113 resides in a demilitarized zone between a trusted network on the IPTV server side and the Internet on the IPTV client side.

IPTV Server 120 as shown includes a content server 130, a content subsystem 135, and a messaging subsystem 140. Content server 130 as shown communicates over WAN 114 with a streaming multimedia connection 151. As indicated above, streaming multimedia connection 151 may comply with any one or more of various streaming multimedia content protocols including RTP, RTP Control Protocol (RTCP), and the like. Although streaming multimedia connection 151 is the only connection between content server 130 and WAN 114 referred to herein explicitly, this is intended to emphasize the significance of streaming multimedia with respect to content server 130 and it will be appreciated that content server 130 may support other types of connections including connections based on web communication protocols such as HTTP/TCP/IP and the like.

Content subsystem 135 represents a variety of systems to acquire multimedia content, reformat it when necessary, and prepare it for transmission over WAN 114. Content subsystem 135 may include, for example, systems for capturing analog and/or digital content feeds, either directly from a content provider or from a content aggregation facility. These contents feeds may be transmitted via VHF/UHF broadcast signals, satellite signals, high speed fiber links, or other suitable transmission means. Content subsystem 135 may further include signal conditioning systems and content preparation systems for encoding content. Content subsystem 135 may further include video on demand servers and digital rights management (DRM) servers for encrypting content. Content server 130 receives or retrieves content from content subsystem 135 and processes the content for transmission over WAN 114 to one or more IPTV clients 102.

Messaging subsystem 140 of IPTV server 120 may include various subsystems that support, but may not be directly related to, delivering multimedia content. Messaging subsystem 140 as shown in FIG. 1 communicates with IPTV clients 102 via a web communication connection 152 and a messaging connection 153. In some embodiments, for example, IPTV clients 102 send requests to messaging subsystem 140 using an HTTP connection 152 via web service router 113 and IPTV clients 102 receive responses and/or notifications from messaging subsystem 140 via a UDP connection 153. In addition, messaging subsystem 140 may support other communication protocols.

As shown in FIG. 1, IPTV clients 102 include a set top box (STB) 106 connected to a display 104. An RG 112 connected to STB 106 via a connection 117 enables IPTV client 102 to communicate over WAN 114. RG 112 may be implemented as any of various types of commercially distributed and pervasive network appliances. RG 112 may be, as an example, a DSL modem connected to or integrated with an IEEE 802.3 (Ethernet) router and/or an 802.11 (wireless) access point. In such implementations, the physical medium that carries connections 151, 152, and 153 and connects RG 112 to WAN 114 may include conventional 2-wire or 4-wire unshielded twisted pair telephone cables while the connections 117 between RG 112 and STB 106 may include CAT 5e or other suitable Ethernet cables as well as wireless Ethernet links. In other embodiments, connections 151, 152, and 153 may be carried over fiber optic cables or other suitable media.

STB 106 and RG 112 are examples of network addressable appliances employed in IPTV system 100. A network addressable appliance, as used herein, refers to a device that incorporates a network communication protocol stack, including a network layer protocol such as Internet Protocol (IP), that defines network addressing and routing. In the implementation shown in FIG. 1, the network on which STB 106 is directly addressable is a local area network (LAN) 115 defined by connections 117. RG 112 as shown resides on and is directly addressable on two networks, namely, LAN 115 and WAN 114.

The depicted implementation of IPTV system 100 also incorporates a local interconnection 116, distinct from the LAN connections 117, that provides communication between related IPTV client systems 102 including, for example, IPTV client systems 102 connected to a common RG 112. In FIG. 1, for example, IPTV clients 102-1 and 102-2 may be referred to as related IPTV clients because they are both connected to a common RG, namely RG 112-1. In the depicted embodiment, local interconnection 116 is a sideband interconnect with respect to LAN 115, i.e., local interconnection 116 enables or supports messaging between related IPTV clients 102 where the messages do not compete for the bandwidth of LAN 115. Local interconnection 116 may be implemented, for example, as a Home Phoneline Network Association (HPNA) compliant interconnection. In such an implementation, the physical medium for local interconnection 116 may include conventional 2-wire or 4-wire twisted pair telephone cables. It should be noted however that, in such a configuration, the use of telephone cables for local interconnection 116 should be implemented such that local interconnection 116 data traffic does not interfere with data traversing connections 151, 152, and 153. In an IPTV client environment, an HPNA or other type of local interconnection 116 may be employed to support the transfer of media content between related IPTV clients 102.

Figure 2:
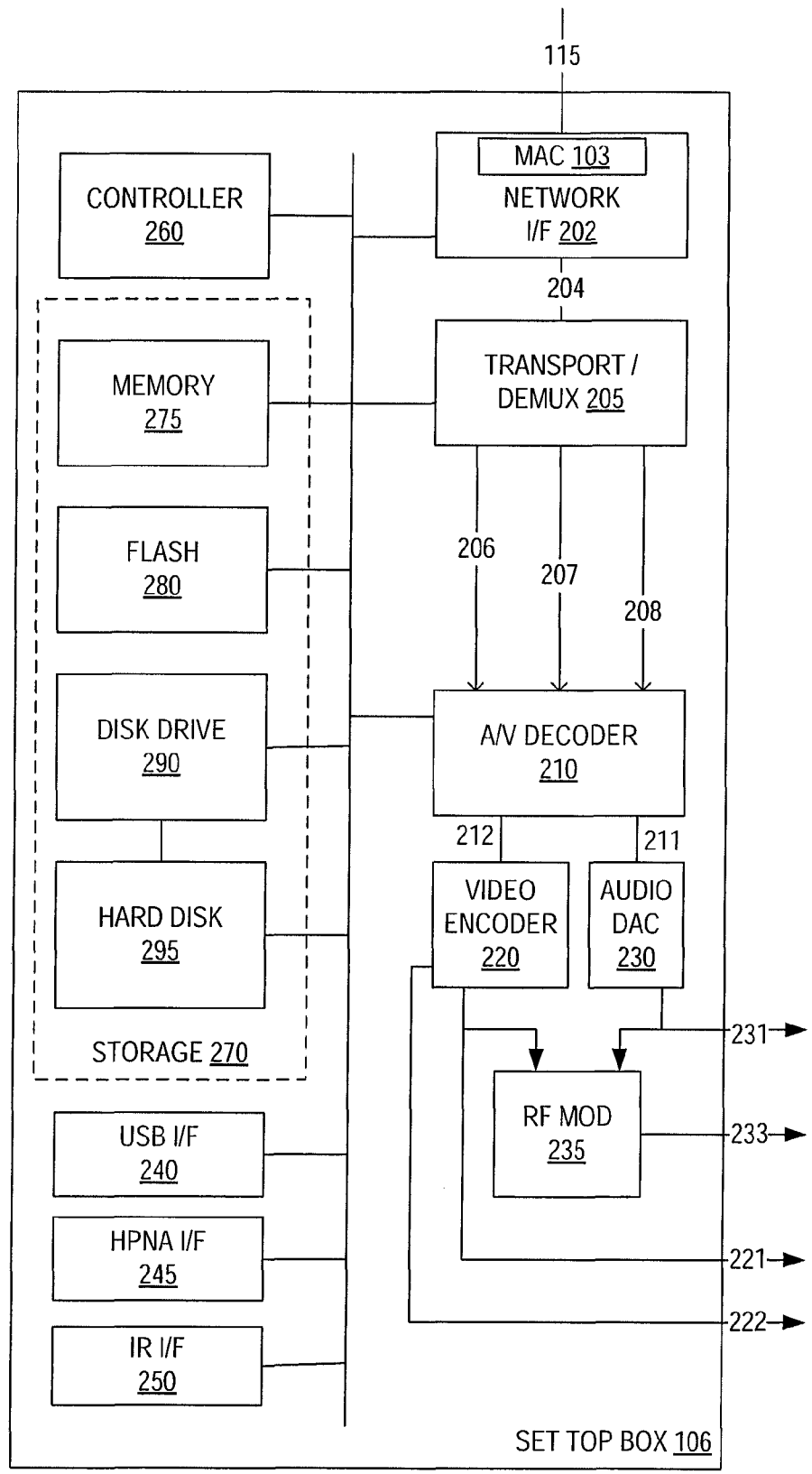
FIG. 2 is a block diagram of selected aspects of an embodiment of a set top box suitable for use in the IPTV system of FIG. 1.

Turning now to FIG. 2, selected components of an embodiment of STB 106 are illustrated. Regardless of the specific implementation, of which STB 106 as shown in FIG. 2 is but an example, an STB 106 suitable for use in an IPTV client includes hardware and/or software functionality to receive streaming multimedia data from an IP-based network and process the data to produce video and audio signals suitable for delivery to an NTSC, PAL, or other type of display 104. In addition, some embodiments of STB 106 may include resources to store multimedia content locally and resources to play back locally stored multimedia content.

In the embodiment depicted in FIG. 2, STB 106 includes a general purpose processing core represented as controller 260 in communication with various special purpose multimedia modules. These modules may include a transport/de-multiplexer module 205, an A/V decoder 210, a video encoder 220, an audio DAC 230, and an RF modulator 235. Although FIG. 2 depicts each of these modules discretely, set top box 106 may be implemented with a system on chip (SoC) device that integrates controller 260 and each of these multimedia modules. In still other embodiments, STB 106 may include an embedded processor serving as controller 260 and a general purpose digital signal processor (DSP) including supporting software to implement at least some of the multimedia modules.

Regardless of the architectural implementation details of the multimedia processing hardware, the embodiment of STB 106 shown in FIG. 2 includes a network interface 202 that enables STB 106 to communicate directly or indirectly external networks such as LAN 115 and WAN 114. Network interface 202 may share many characteristics with conventional network interface cards (NICs) used in personal computer platforms. For embodiments in which LAN 115 is an Ethernet LAN, for example, network interface 202 may implement level 1 (physical) and level 2 (data link) layers of a standard communication protocol stack by enabling access to the twisted pair or other form of physical network medium and by supporting low level addressing using media access control (MAC) addressing. In these embodiments, every network interface 202 includes a globally unique 48-bit MAC address 103 stored in a ROM or other persistent storage element of network interface 202. Similarly, at the other end of the LAN connection 113, RG 112 has a network interface (not depicted) with its own globally unique MAC address 103.

Network interface 202 may further include or support software or firmware providing one or more complete network communication protocol stacks. Where network interface 202 is tasked with receiving streaming multimedia communications, for example, network interface 202 may include a streaming video protocol stack such as an RTP/UDP stack. In these embodiments, network interface 202 is operable to receive a series of streaming multimedia packets and process them to generate a digital multimedia stream 204 that is provided to transport/demux 205.

The digital multimedia stream 204 is a sequence of digital information that includes interlaced audio data streams and video data streams. The video and audio data contained in digital multimedia stream 204 may be referred to as "in-band" data in reference to a particular frequency bandwidth within which such data might have been transmitted in an RF transmission environment. Digital multimedia stream 204 may also include "out-of-band" data which might encompass any type of data that is not audio or video data, but may refer in particular to data that is useful to the provider of an IPTV service. This out-of-band data might include, for example, billing data, decryption data, and data enabling the IPTV service provider to manage IPTV clients 102 remotely.

Transport/demux 205 as shown is operable to segregate and, if necessary, decrypt the audio, video, and out-of-band data in digital multimedia stream 204. Transport/demux 205 outputs a digital audio stream 206, a digital video stream 207, and an out-of-band digital stream 208 to A/V decoder 210. Transport/demux 205 may also, in some embodiments, support or communicate with various peripheral interfaces of STB 106 including an infra-red (IR) interface 250 suitable for use with an IR remote control unit (not shown) and a front panel interface (not shown).

A/V decoder 210 processes digital audio, video, and out-of-band streams 206, 207, and 208 to produce a native format digital audio stream 211 and a native format digital video stream 212. A/V decoder processing may include decompression of digital audio stream 206 and/or digital video stream 207, which are generally delivered to STB 106 as compressed data streams. In some embodiments, digital audio stream 206 and digital video stream 207 are Moving Pictures Expert Group (MPEG) compliant streams and, in these embodiments, A/V decoder 210 is an MPEG decoder.

The out-of-band digital stream 208 may include information about or associated with content provided through the audio and video streams. This information may include, for example, the title of a show, start and end times for the show, type or genre of the show, broadcast channel number associated with the show, and so forth. A/V decoder 210 may decode such out-of-band information. MPEG embodiments of A/V decoder 210 support a graphics plane as well as a video plane and at least some of the out-of-band information in stream 208 may be incorporated by A/V decoder 210 into its graphics plane and presented to the display 104, perhaps in response to a signal from a remote control device.

The native format digital audio stream 211 as shown in FIG. 2 is routed to an audio digital-to-analog converter (DAC) 230 to produce an audio output signal 231. The native format video stream 212 is routed to an NTSC/PAL or other suitable video encoder 220, which generates digital video outputs signals suitable for presentation to an NTSC or PAL compliant display device 104. In the depicted embodiment, for example, video encoder 220 generates a composite video output signal 221 and an S video output signal 222. An RF modulator 235 receives the audio and composite video outputs signals 231 and 221 respectively and generates an RF output signal 233 suitable for providing to an analog input of display 104.

In addition to the multimedia modules described, STB 106 as shown includes and various peripheral interfaces. STB 106 as shown includes, for example, a USB interface 240 and a local interconnection interface 245. Local interconnection interface 245 may, in some embodiments, support the HPNA or other form of local interconnection 116 shown in FIG. 1.

The illustrated embodiment of STB 106 includes storage resources 270 that are accessible to controller 260 and that may be accessible to one or more of the multimedia modules. Storage 270 may include DRAM or another type of volatile storage identified as memory 275 as well as various forms of persistent or nonvolatile storage including flash memory 280 and/or other suitable types of persistent memory devices including ROMs, EPROMs, and EEPROMs. In addition, the depicted embodiment of STB 106 includes a mass storage device in the form of one or more magnetic hard disks 295 supported by an IDE compliant or other type of disk drive 290. Embodiments of STB 106 employing mass storage devices may be operable to store multimedia content locally and play back stored content when desired.

Figure 3:
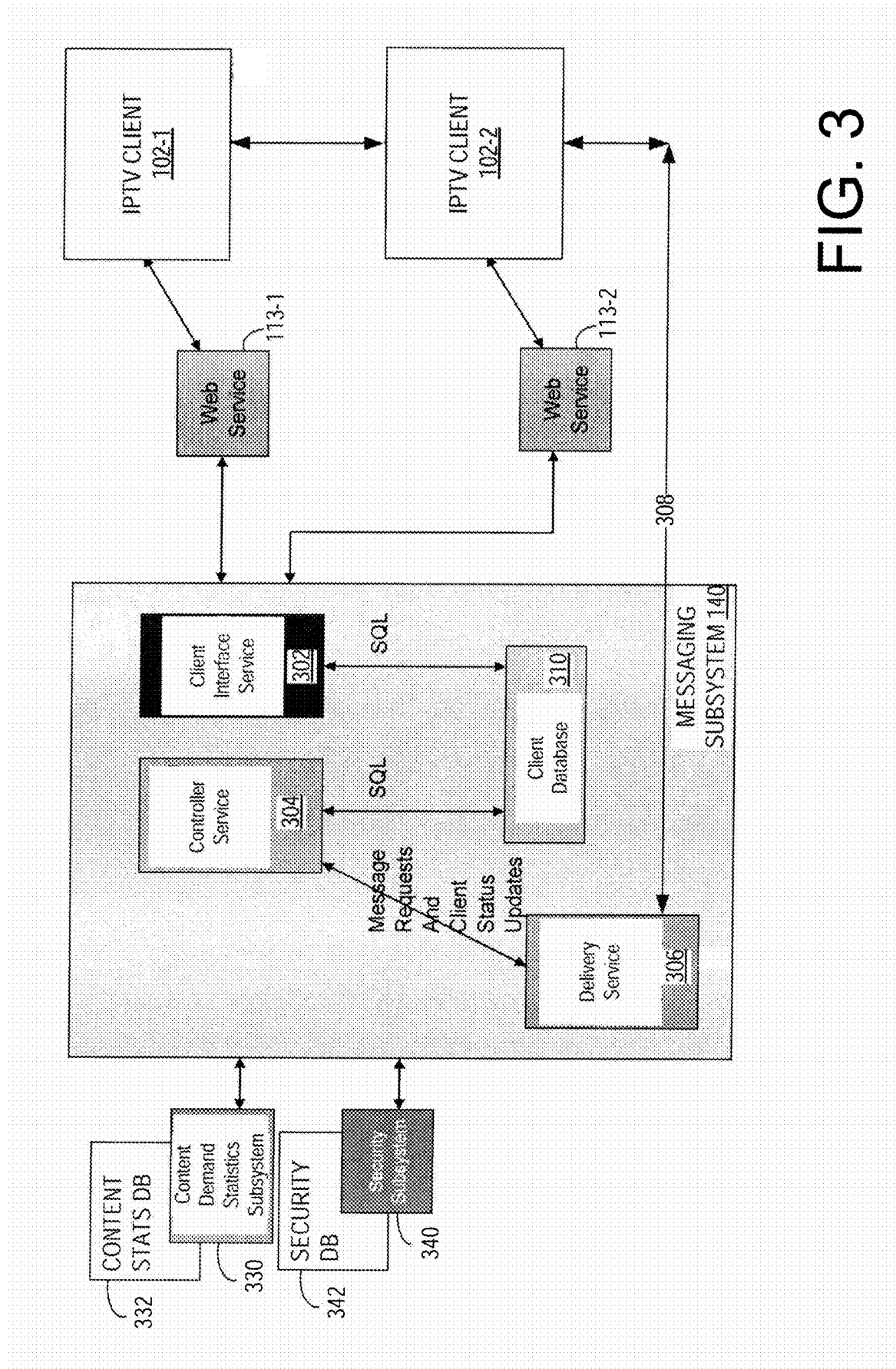
FIG. 3 is a block diagram of selected elements of an embodiment of a messaging subsystem of the IPTV system of FIG. 1.

Referring now to FIG. 3, a block diagram illustrates additional detail of the messaging subsystem 140 depicted in FIG. 1. The embodiment of messaging subsystem 140 depicted in FIG. 3 is suitable for use in implementing or supporting a feature enabling a subscriber to view content demand statistics. As suggested by their name, content demand statistics are indicative of the past, present, or future demand for content provided by the IPTV system 100.

Content demand statistics beneficially enable a first subscriber to identify content that the first subscriber might want to view as well as identifying content that the first subscriber might not wish to view. In some embodiments, a first subscriber defines a content demand buddy list made up of individual second subscribers to IPTV system. The content demand buddy list may include a subset of other subscribers to IPTV system 100. The first subscriber may also define the content demand groups more broadly using demographics, geography, or other parameters of potential interest.

In some embodiments, a second subscriber is added to a content demand buddy list of a first subscriber only after the second subscriber explicitly authorizes the first subscriber. In some embodiments, the first subscriber may be able to view content demand statistics of a group without defining the group explicitly. For example, a content demand group may include or consist of a group of all consenting subscribers, i.e., subscribers who have indicated in a user preference or otherwise that their content demand statistics are public.

As depicted in FIG. 3, messaging subsystem 140 includes a client interface service 302, a controller service 304, a delivery service 306, and a client database 310. In addition, messaging subsystem 140 as shown is connected to or otherwise interfaced to a security subsystem 340 and a content demand statistics subsystem 330.

Client interface service 302 processes incoming requests from IPTV clients 102 via web services 113. Client interface service 302 may consult with client database 310 to retrieve information pertaining to a requesting client. Controller service 304 interacts with client interface service 302, client database 310, and delivery service 306 to process incoming messages and, in some cases, generate responses. In the depicted embodiment, delivery service 306 may be responsible for encoding responses, as well as server-initiated notifications, as UDP-based messages suitable for transmission via connection 153 of WAN 114 (FIG. 1) to an IPTV client 102.

Messaging subsystem 140 as shown in FIG. 3 supports or provides a content demand statistics feature that enables subscribers to define buddy lists of one or more individuals and/or to define groups categorically and to view content demand statistics for the individuals in a defined group or for the defined group as a whole. To support this feature, messaging subsystem 140 as seen in FIG. 3 communicates with content demand statistics subsystem 330 and a content demand statistics security subsystem 340. Content statistics database 332 is accessible to content demand statistics subsystem 330 while security database 342 is accessible to security subsystem 340.

Security subsystem 340 and its corresponding security database 342 include information indicative of content demand statistic authorizations granted by the various subscribers to IPTV system 100. Content demand statistics subsystem 330 and its corresponding content statistics database 332 contain content demand statistics indicative of the content that subscribers have watched in the past, are watching currently, and/or plan to watch in the future. The future statistics may be based on information indicative of future content demand including, as examples, subscriptions or commitments for upcoming pay per view events and/or information from a content recording schedule of a subscriber. Past content demand may be determined by referring to a historical log of information while current demand may be determined based on content currently being viewed.

Some aspects of a disclosed system and method for providing and accessing content demand statistics are implemented as computer software via a computer program product. A computer program product is computer readable storage medium upon which are embedded instructions for accessing and retrieving content demand statistics. The instructions, when executed by appropriate components of a system such as IPTV system 100 perform a method 400 of using content demand statistics. An embodiment of method 400 is depicted as the flow diagram of FIG. 4.

Figure 4:
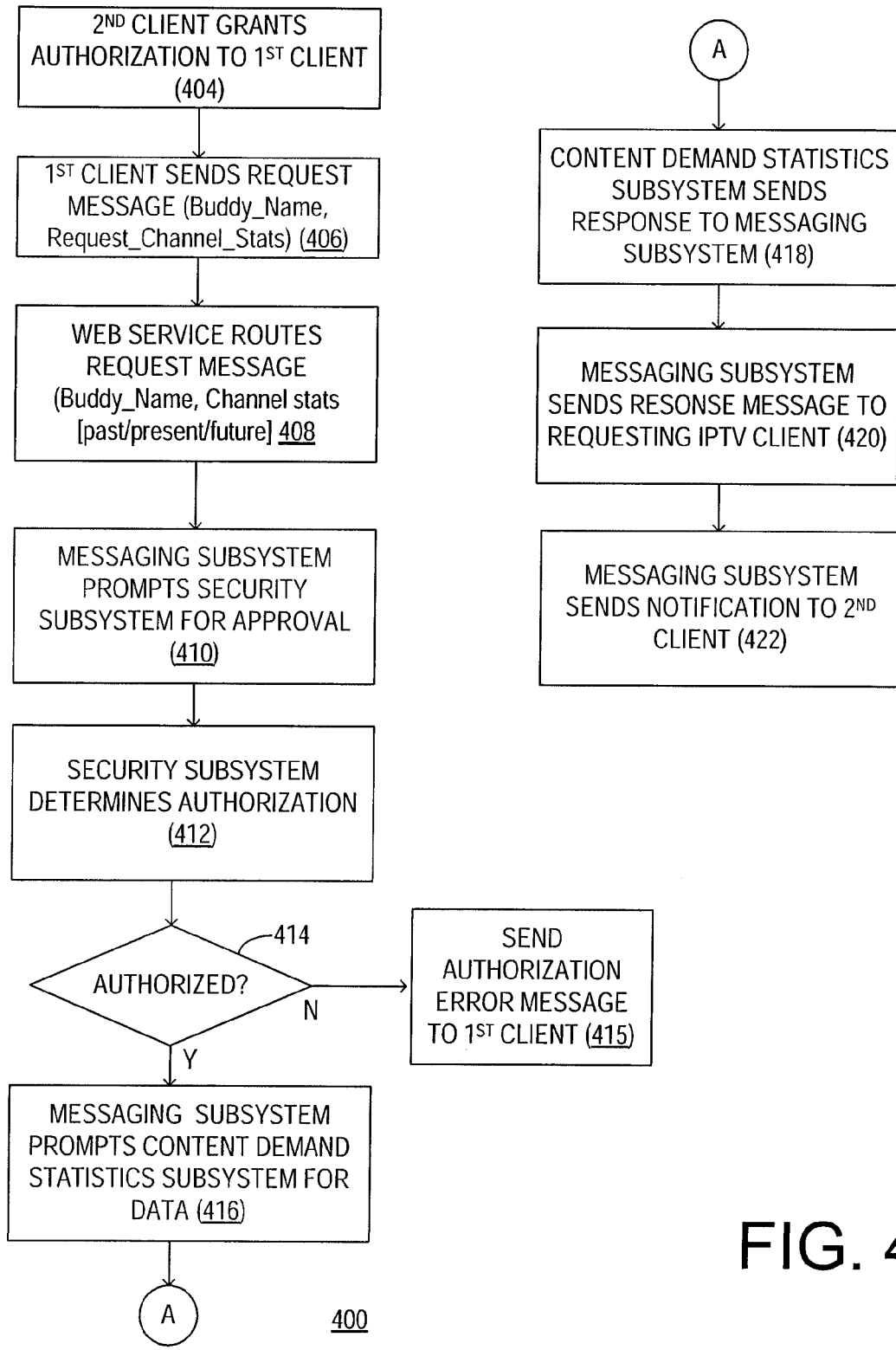
FIG. 4 is a flow diagram of an embodiment of a method for determining content demand statistics suitable for use in the IPTV system of FIG. 1.

Referring now to FIG. 4, the depicted embodiment of method 400 begins with a second subscriber to IPTV system 100 granting (block 404) content demand authorization to a first subscriber. The authorization may have been in response to a request from the first subscriber. Alternatively, the second subscriber may have authorized, without prompting, the first subscriber specifically or all subscribers generally.

When the first subscriber signs on to the IPTV system, the first subscriber may be presented with or may be able to browse to a menu that includes an object for content demand statistics. If the first subscriber selects the content demand statistics object, the first subscriber may be presented with a menu identifying one or more other subscribers (buddies) or one or more groups of buddies, or one or more categorical groups, or any combination thereof.

If the first subscriber selects the second subscriber from the menu, IPTV client 102-1 generates a content demand statistics request identifying the request and the second subscriber and sends (block 406) the request. Web service 113-1 routes (block 408) the request to messaging subsystem 140 as a request to retrieve past, present, or future content demand statistics (block 408) of the second subscriber.

In response to receiving the request from web service 113-1, the messaging subsystem then prompts (block 410) the security subsystem to determine if the first subscriber is authorized to access the second subscriber's content demand statistics. If the security subsystem determines (blocks 412 and 414) that the first subscriber is authorized, the security subsystem informs the messaging subsystem. If the security subsystem determines that the first subscriber is not authorized, an "authorization error" message is sent (block 415) to the first subscriber.

In response to receiving authorization verification from the security subsystem, the messaging subsystem then sends (block 416) a request message or other prompt to the content demand statistics subsystem. The request identifies the subscriber whose statistics are to be viewed and the type of content demand statistics requested, e.g., past, present, or future.

The content demand subsystem responds (block 418) to the messaging subsystem. The response may include the content demand statistics of the second subscriber. Although the format for presenting the content demand statistics is an implementation detail, one implementation, for example, presents the content demand statistics in a spreadsheet or table format with each row corresponding a different show or other item of stored multimedia content and each column representing a buddy subscriber and or multiple subscribers. The table data might be sorted by demand statistics so that resulting sorted table quickly conveys the relative levels of demand for each type of structure.

The messaging subsystem may then notify the IPTV client system by sending (block 420) a notification message. The notification message may include the content demand statistics retrieved from the content demand statistics subsystem 330. As seen in FIG. 4, the messaging system may then send (block 422) a notification to the second subscriber indicating that the first subscriber recently accessed the second subscriber's content demand statistics.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. A demand determination method, comprising:
    receiving, by a client device executing a client application associated with a first subscriber, user input identifying at least one other subscriber, including a second subscriber, and a particular demand type wherein the particular demand type indicates which of a set of available demand types is requested and wherein the set of available demand types includes:
        past demand, corresponding to content previously watched;
        current demand, corresponding to content currently being watched; and
        future demand, corresponding to future content currently scheduled;
    sending, to a server, a content demand statistics request identifying the second subscriber and the particular demand type; and receiving, from the server, content demand data of the particular demand type, wherein the content demand data is indicative of demand for multimedia content by the second subscriber.

2. The method of claim 1, wherein the content demand statistics request identifies one other subscriber.

3. The method of claim 1, further comprising:
prior to sending the content demand statistics request, requesting the at least one other subscriber for authorization to access the content demand data; and
wherein receiving the content demand data is contingent upon the second subscriber granting the authorization to the first subscriber.

4. The method of claim 3, further comprising, informing the first subscriber responsive to determining that the at least one other subscriber has granted authorization to the first subscriber.

5. The method of claim 1, wherein the future demand is determined based, at least in part, on information including: content recording schedule information and pay per view purchase information.

6. The method of claim 1, wherein the client device includes a set top box.

7. A client device in a multimedia content network, the client device comprising:
a processor;
a network interface configured to receive a multimedia content stream;
a decoder configured to generate native format content based on the content stream; and
computer readable non-transitory storage including processor executable program instructions that, when executed by the processor, cause the processor to perform operations comprising:
receiving, by a premises device executing a client application associated with a first subscriber, user input identifying at least one other subscriber, including a second subscriber, and a particular demand type wherein the particular demand type indicates which of a set of available demand types is requested and wherein the set of available demand types includes:
past demand, corresponding to content previously watched;
current demand, corresponding to content currently being watched; and
future demand, corresponding to future content currently scheduled;
sending, to a server, a content demand statistics request identifying the second subscriber and the particular demand type; and
receiving, from the server, content demand data of the particular demand type, wherein the content demand data is indicative of demand for multimedia content by the second subscriber.

8. The client device of claim 7, wherein the content demand statistics request identifies one other subscriber.

9. The client device of claim 7, wherein the future demand is determined based, at least in part, on information including: content recording schedule information and pay per view commitment information.

10. The client device of claim 7, wherein the at least one other subscriber comprises a plurality of other subscribers and wherein the content demand data indicates content demand statistics corresponding to each of the plurality of other subscribers.

11. The client device of claim 7, wherein the operations include:

prior to sending the content demand statistics request, requesting the at least one other subscriber for authorization to access the content demand data; and
wherein receiving the content demand data is contingent upon the second subscriber granting the authorization to the first subscriber.

12. The client device of claim 11, wherein the operations include:
informing the first subscriber responsive to determining that the at least one other subscriber has granted authorization to the first subscriber.

13. The client device of claim 7, wherein the future demand is determined based, at least in part, on information including: content recording schedule information and pay per view purchase information.

14. The client device of claim 7, wherein the client device includes a set top box.

15. A non-transitory computer readable memory including processor-executable program instructions, which, when executed by a processor, cause the processor to perform operations for determining demand for multimedia content in a multimedia provider network, the operations comprising:
receiving, by a premises device executing a client application associated with a first subscriber, user input identifying at least one other subscriber, including a second subscriber, and a particular demand type wherein the particular demand type indicates which of a set of available demand types is requested and wherein the set of available demand types includes:
past demand, corresponding to content previously watched;
current demand, corresponding to content currently being watched; and
future demand, corresponding to future content currently scheduled;
sending, to a server, a content demand statistics request identifying the second subscriber and the particular demand type; and
receiving, from the server, content demand data of the particular demand type, wherein the content demand data is indicative of demand for multimedia content by the second subscriber.

16. The computer readable memory of claim 15, wherein the content demand statistics request identifies one other subscriber.

17. The computer readable memory of claim 15, wherein the future demand is determined based, at least in part, on information including: content recording schedule information and pay per view commitment information.

18. The computer readable memory of claim 15, wherein the at least one other subscriber comprises a plurality of other subscribers and wherein the content demand data indicates content demand statistics corresponding to each of the plurality of other subscribers.

19. The computer readable memory of claim 15, wherein the operations include:
prior to sending the content demand statistics request, requesting the at least one other subscriber for authorization to access the content demand data; and
wherein receiving the content demand data is contingent upon the second subscriber granting the authorization to the first subscriber.

20. The computer readable memory of claim 19, wherein the operations include:

informing the first subscriber responsive to determining that the at least one other subscriber has granted authorization to the first subscriber.

\* \* \* \* \*